United States Patent
Jacobs (10) Patent No.: US 6,922,765 B2
(45) Date of Patent: Jul. 26, 2005

(54) METHOD OF ALLOCATING PHYSICAL MEMORY SPACE HAVING PINNED AND NON-PINNED REGIONS

(75) Inventor: Brent William Jacobs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 828 days.

(21) Appl. No.: 09/886,817

(22) Filed: Jun. 21, 2001

(65) Prior Publication Data

US 2002/0199075 A1 Dec. 26, 2002

(51) Int. Cl.[7] .............................................. G06F 12/00
(52) U.S. Cl. ...................................................... 711/173
(58) Field of Search ................................. 711/170–173

(56) References Cited

U.S. PATENT DOCUMENTS

| | | | |
|---|---|---|---|
| 4,761,737 A | | 8/1988 | Duvall et al. |
| 5,493,652 A | | 2/1996 | Koufopavlou et al. |
| 5,604,902 A | | 2/1997 | Burkes et al. |
| 6,006,033 A | * | 12/1999 | Heisch ........................ 717/158 |
| 6,182,089 B1 | | 1/2001 | Ganapathy et al. |
| 2003/0005223 A1 | * | 1/2003 | Coulson et al. ............. 711/118 |

* cited by examiner

*Primary Examiner*—Matthew D. Anderson
(74) *Attorney, Agent, or Firm*—Dugan & Dugan (57) ABSTRACT

In a physical memory space, a pinned memory region is defined at one end of the space and a non-pinned region is defined at the other end of the space. A free region is between the pinned and non-pinned regions. Requests for pinned memory allocations are satisfied either by using holes in the pinned region or by appending the requested block to the end of the pinned region in the free region. The free region may be widened to accommodate pinned memory allocations. Requests for non-pinned memory allocations are satisfied by holes in the non-pinned region, by being appended to the non-pinned region in the free region or by filling holes in the pinned region, in that order.

20 Claims, 10 Drawing Sheets

METHOD OF ALLOCATING PHYSICAL MEMORY SPACE HAVING PINNED AND NON-PINNED REGIONS

FIELD OF THE INVENTION

This invention is concerned with computing devices, and is more particularly concerned with physical memory management in computing devices.

BACKGROUND OF THE INVENTION

According to conventional practice, pinned memory requests and non-pinned memory requests are allocated in an interspersed fashion within physical memory resources such as random access memory (RAM). As is familiar to those who are skilled in the art, pinned memory requests are requests for a block of memory which must be contiguous and cannot be shifted within the physical memory space after original allocation. Pinned memory requests can originate from device drivers for PCI devices, direct memory access (DMA) engines, or other functionality requiring access to physical memory which cannot be moved once allocated. Non-pinned memory requests may originate from other functions which view physical memory through a memory management unit (MMU), such as a microprocessor's and can be allocated in a noncontiguous manner and can be moved within the physical memory space after original allocation.

A disadvantage of the conventional practice of interspersing pinned and non-pinned memory requests is that the physical memory space may become fragmented, particularly as blocks are allocated and deallocated over time, which may make it difficult to provide large contiguous free spaces in physical memory that may be required to accommodate large pinned memory requests.

SUMMARY OF THE INVENTION

According to an aspect of the invention, a method of allocating memory requests in a physical memory space defined between a first boundary and a second boundary includes allocating non-pinned memory requests from the first boundary, and allocating pinned memory requests from the second boundary.

A non-pinned region may be provided from the first boundary toward the second boundary, and a pinned region may be provided from the second boundary toward the first boundary, with a free region defined between the non-pinned region and the pinned region. The non-pinned region is a region of the physical memory space in which only non-pinned memory requests may be allocated. The pinned region is a region of the physical memory space in which or adjacent to which pinned memory requests may be allocated. The free region is an unallocated space between the non-pinned region and the pinned region.

The method may further include receiving a pinned-memory request, determining whether a hole that accommodates the received pinned memory request exists in the pinned region, allocating the received pinned memory request to the hole if such a hole exists, and allocating the received pinned memory request in the free region adjacent the pinned region if such a hole does not exist. If more than one such hole exists, the received pinned memory request may be allocated to a smallest one of such holes.

Within the context of the pinned region, a "hole" shall be understood to mean a contiguous space that is either free of memory allocation or is occupied only by one or more non-pinned memory blocks.

A background process may be operated to compact the non-pinned region by moving at least one non-pinned memory block from an end of the non-pinned region adjacent the free region to fill at least one hole in the non-pinned region.

In the context of the non-pinned region, a "hole" will be understood to mean a contiguous space that is free of memory allocation.

According to another aspect of the invention, there is provided a method of allocating a memory request in a physical memory space defined between a first boundary and a second boundary. A non-pinned region is provided from the first boundary toward the second boundary and a pinned region is provided from the second boundary toward the first boundary, with a free region being defined between the non-pinned region and the pinned region. The method includes receiving a pinned memory request, determining that there is no hole in the pinned region that accommodates the received pinned memory request, determining that the free region is not large enough to accommodate the pinned memory request, widening the free region by moving a non-pinned memory block from an end of the non-pinned region adjacent the free region to a hole in the pinned region, and allocating the received pinned memory request to the widened free region.

According to still another aspect of the invention, there is provided a method of allocating a memory request in a physical memory space defined between a first boundary and a second boundary. A non-pinned region is provided from the first boundary toward the second boundary and a pinned region is provided from the second boundary toward the first boundary, with a free region being defined between the non-pinned region and the pinned region. The method includes the steps of receiving a pinned memory request, determining that there is a non-pinned memory block in the pinned region that occupies a hole at least as large as the received pinned memory request, moving the non-pinned memory block in the pinned region to free the hole that is at least as large as the pinned memory request, and allocating the received pinned memory request to the freed hole that is at least as large as the received pinned memory request. The non-pinned memory block may be moved to the free region adjacent to the non-pinned region.

Computer program products may be provided in accordance with these and other aspects of the invention. Each inventive program product may be carried by a medium readable by a computer (e.g., a carrier wave signal, a floppy disc, a hard drive, a random access memory, etc.).

The methods of handling memory allocation requests in accordance with the invention provide for improved efficiency in memory management, including reduced fragmentation of the physical memory space and improved ability to provide large contiguous spaces to accommodate large pinned memory requests.

Other objects, features and advantages of the present invention will become more fully apparent from the following detailed description of the preferred embodiments, the appended claims and the accompanying drawings.

DETAILED DESCRIPTION OF PREFERRED EMBODIMENTS

Figure 1:
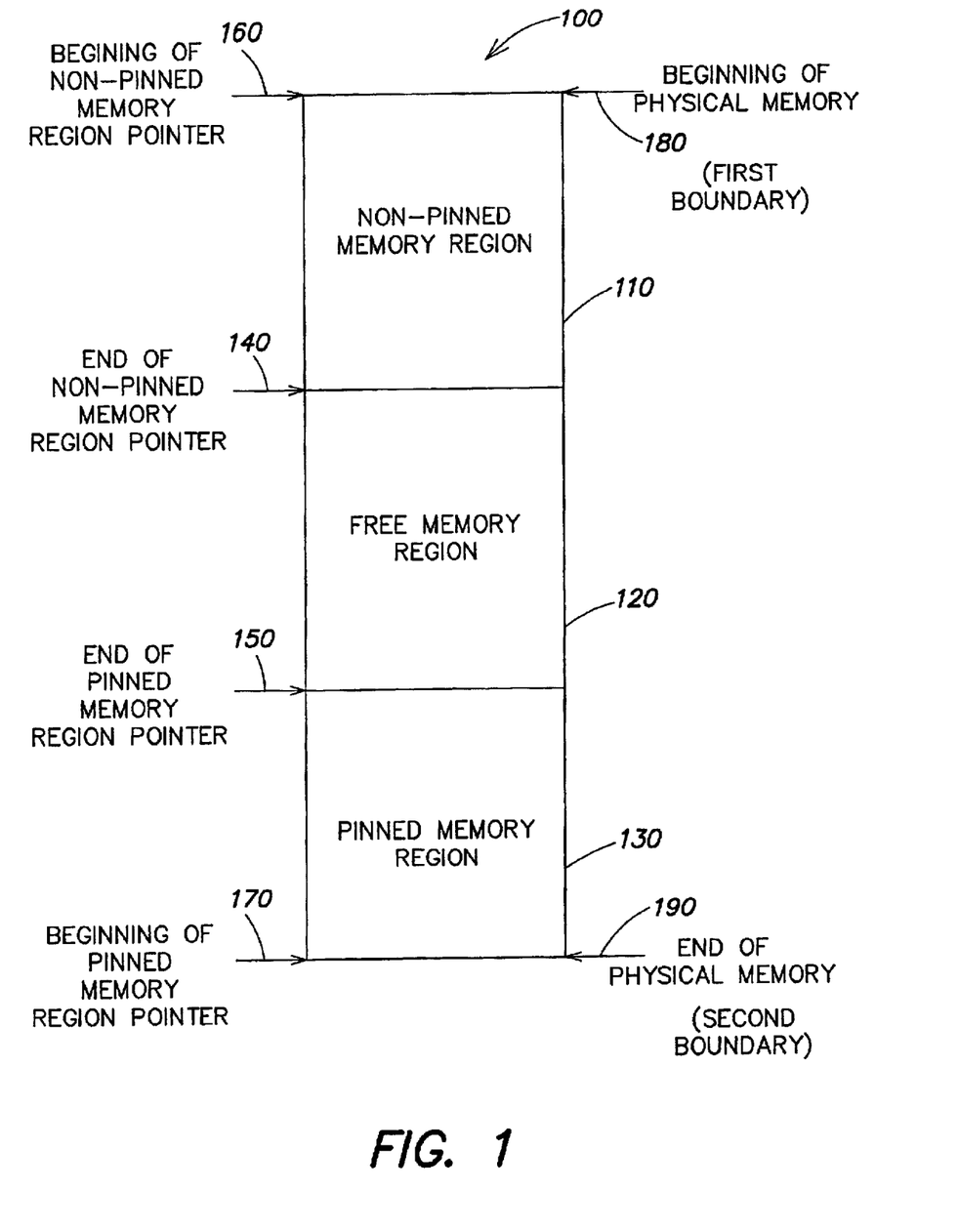
FIG. 1 is a schematic illustration of a technique for organizing physical memory in accordance with the invention.

FIG. 1 is a schematic illustration of a manner of organizing physical memory in accordance with the invention. In FIG. 1, reference numeral 100 generally indicates a physical memory space. The physical memory space 100 is defined between a first boundary 180 and a second boundary 190. A non-pinned memory region 110 (also referred to as a "non-pinned region") extends from the first boundary 180 toward the second boundary 190. A pinned memory region 130 (also referred to as a "pinned region") extends from the second boundary 190 toward the first boundary 180. A free memory region 120 (also referred to as a "free region") is defined between the non-pinned region 110 and the pinned region 130. The non-pinned region is a region of the physical memory space in which only non-pinned memory requests may be allocated. The pinned region is a region of the physical memory space in which or adjacent to which pinned memory requests may be allocated. The free region is an unallocated space between the non-pinned region and the pinned region.

Pointers 160 and 140 respectively indicate the beginning and the end of the non-pinned region 110. Pointers 170 and 150 respectively indicate the beginning and the end of the pinned region 130. In general, at the beginning of an allocation process non-pinned memory requests are allocated from the first boundary 180 so that the non-pinned region 110 grows into the free region 120. Also, pinned memory requests are allocated from the second boundary 190 so that the pinned region 130 grows into the free region 120.

Figure 2:
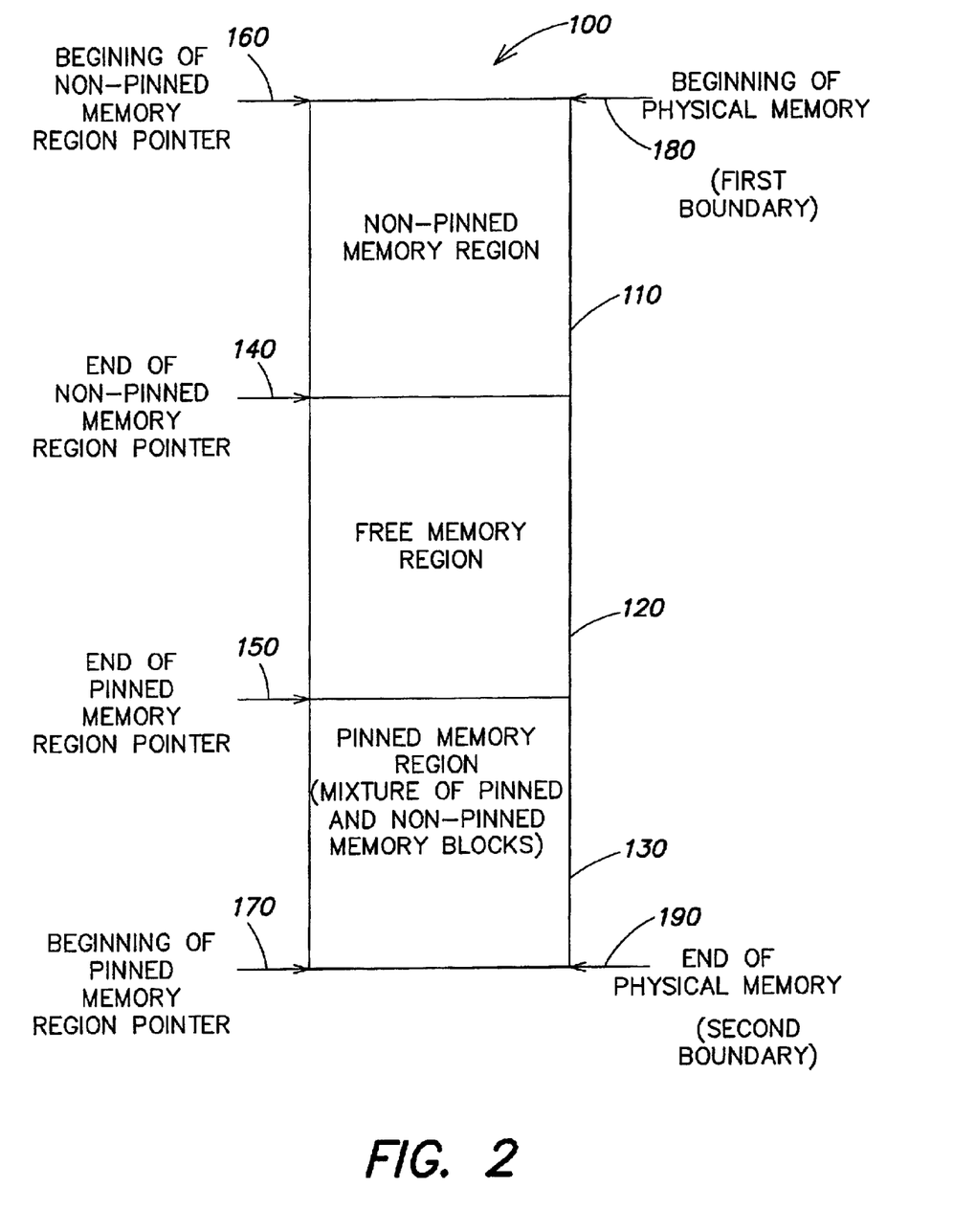
FIG. 2 is a view similar to FIG. 1, showing a condition of the physical memory after a period of time in which memory requests have been allocated and deallocated.

FIG. 2 is a view similar to FIG. 1, showing a condition of the physical memory space 100 after allocations and deallocations of memory requests have occurred over a period of time. It will be noted that the pinned memory region 130 now includes a mixture of pinned and non-pinned memory blocks. Meanwhile, the free region 120 continues to be available to accommodate large pinned memory requests. Specific processes for handling memory allocation requests in accordance with the invention which result in the condition shown in FIG. 2 will be described below.

Figure 3:
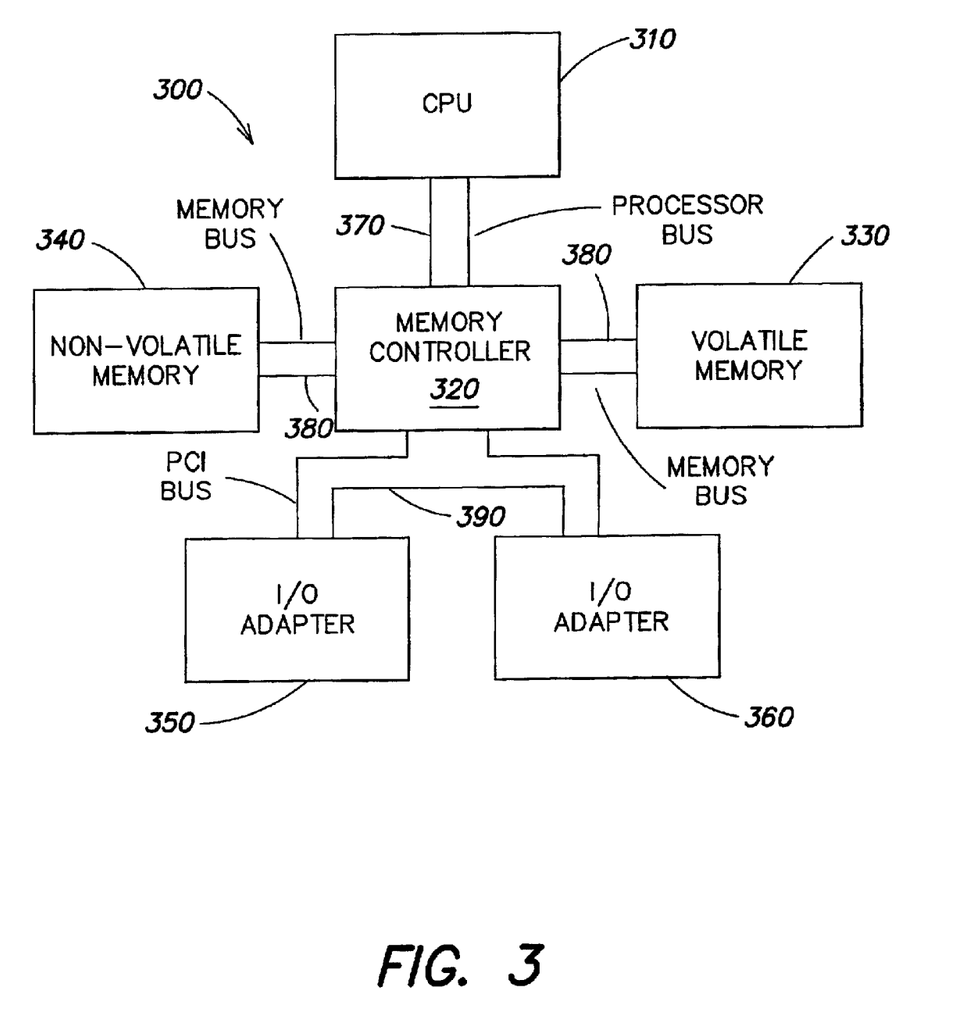
FIG. 3 is a simplified block diagram of a computing device in which the present invention may be applied.

FIG. 3 is a simplified block diagram of a computing device 300 in which the present invention is applied. The computing device 300 may be a computer or any other device which utilizes random access memory (RAM).

The computing device 300 includes a central processing unit (CPU) 310, a memory controller 320, volatile memory (e.g., RAM) 330, non-volatile memory 340 and input/output (I/O) adapters 350 and 360. A processor bus 370 interconnects the CPU 310 and the memory controller 320. A memory bus 380 interconnects the memory controller 320 and the volatile memory 330 and the non-volatile memory 340. A PCI bus 390 interconnects memory controller 320 with I/O adapters 350, 360.

All of the hardware making up the computing device 300 may be conventional.

The CPU 310 includes a Memory Management Unit (MMU) which is not separately shown. The MMU allows instructions running in the CPU 310 to use virtual addresses which are translated into physical addresses by the MMU. The MMU divides the virtual and physical address ranges into individual units called pages, which may or may not be of fixed length. A typical page length is 4096 bytes. The physical addresses are mapped to portions of the volatile memory 330 or the non-volatile memory 340.

Allocation of virtual memory appears as a contiguous set of pages, or memory addresses, to the instructions running in the CPU 310, but may be mapped to non-contiguous physical pages by the MMU. This permits the physical page to which a virtual page is mapped to be changed without affecting the instructions which use the virtual page. Consequently, memory blocks allocated in this way are said to be "non-pinned".

The I/O adapters 350, 360 are generally not privy to the mapping of virtual to physical addresses performed by the MMU of the CPU 310. Consequently, pages in volatile memory 330 or non-volatile memory 340 which are accessed by the I/O adapters 350, 360 in addition to the CPU 310 must not be moved while the I/O adapters are accessing the pages. In such cases, the physical page location of a fixed virtual to physical page mapping is said to be "pinned". The buffer space in memory required by an I/O adapter 350, 360 often spans several pages and because the I/O adapter deals directly with the physical addresses, these pages are generally required to be contiguous.

The memory management techniques of the present invention, as described herein, accommodate the need for pinned memory allocations, while utilizing the physical memory in an efficient manner.

Figure 4A:
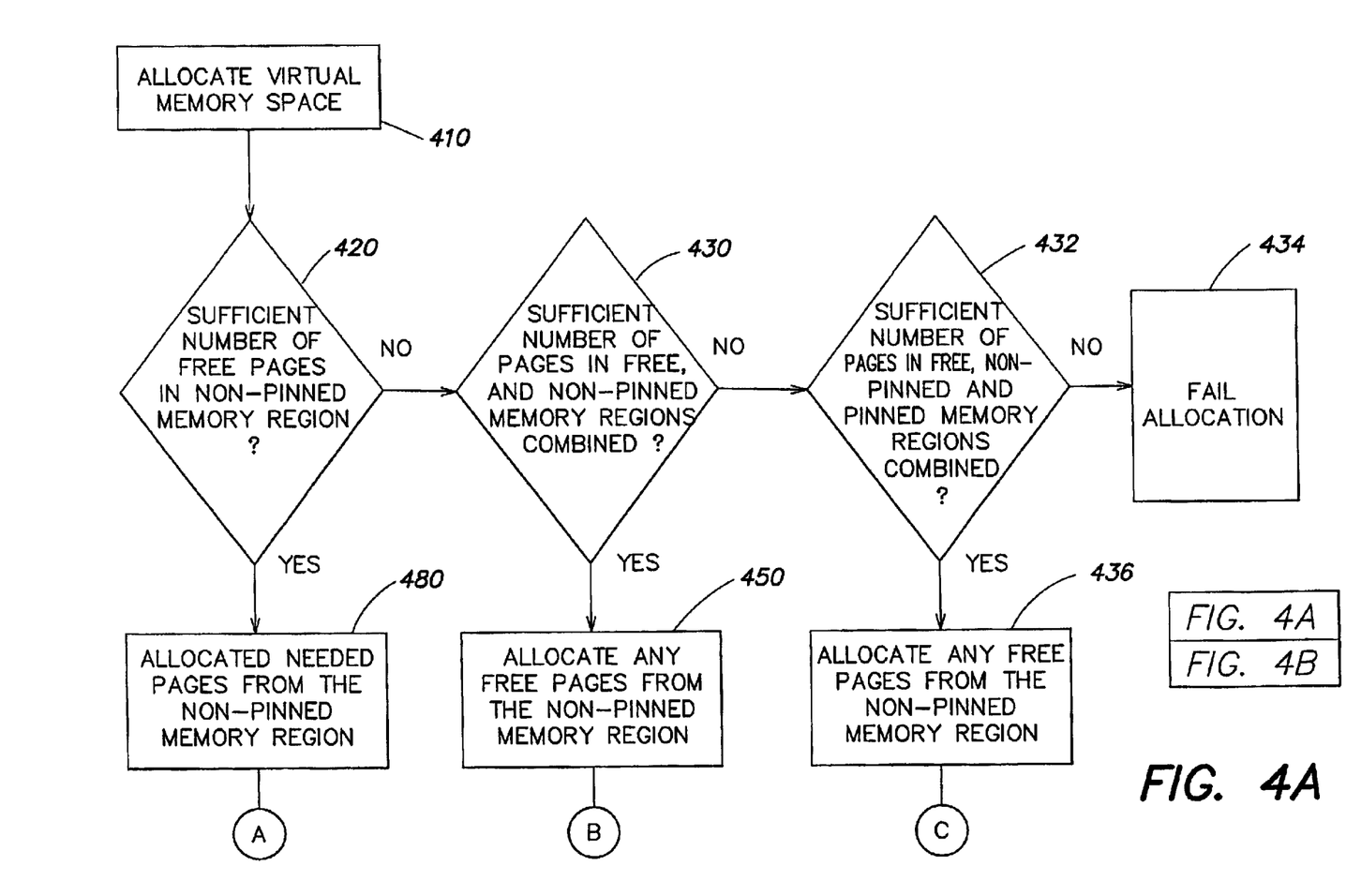
FIGS. 4A and 4B together form a flow chart that illustrates a process for handling a non-pinned memory request in accordance with the invention.
Figure 4B:
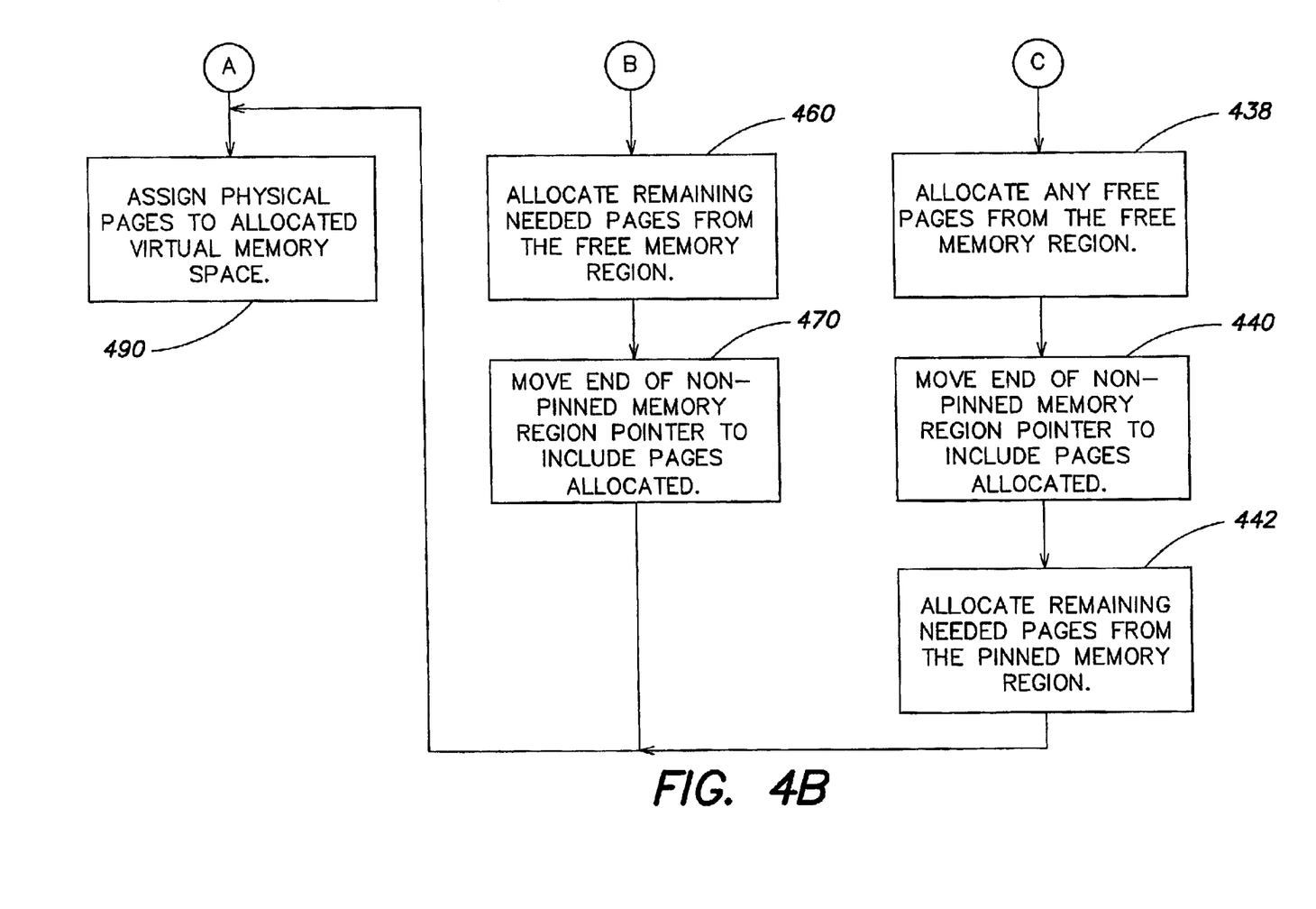

FIGS. 4A and 4B together form a flow chart that illustrates handling of a request for a non-pinned memory allocation.

Initially, when a request for a non-pinned memory block is received, a virtual memory range is allocated (step 410). It is then determined, at decision block 420, whether there are a sufficient number of free pages within the non-pinned region 110 (FIG. 1) which have been freed through prior deallocations. If such is the case, then the number of needed pages is allocated from the non-pinned region 110, as indicated at block 480 in FIG. 4A. Then, as indicated by block 490, the physical pages allocated at block 480 are mapped to the virtual memory space allocated at block 410.

Referring again to decision block 420, if it is found that there is not a sufficient number of free pages in the non-pinned region, then decision block 430 follows 420. At decision block 430 it is determined whether there is a sufficient number of free pages in the non-pinned region 110 and the free region 120, combined. If so, block 450 follows, at which any free pages within the non-pinned region are first allocated. Then block 460 is performed. At block 460, the remaining needed pages are allocated from the free region 120. The pages allocated from the free region are a set of contiguous pages starting with the page pointed to by the end of non-pinned region pointer 140 (FIG. 1). Then, at block 470, the end of non-pinned region pointer 140 is moved to include the pages allocated from the free region at block 460. Following block 470 is block 490, at which the allocated physical memory pages are mapped to the virtual memory space allocated at block 410.

Referring again to decision block 430, if it is determined in that block that there is not a sufficient number of free pages in the non-pinned and free regions, then decision block 432 follows. At decision block 432 it is determined whether there is a sufficient number of pages for the received non-pinned memory request in the non-pinned, pinned and free regions. If not, the memory allocation fails (block 434) and a suitable message is issued.

However, if it is determined at block 432 that there is a sufficient number of free pages in the non-pinned, pinned and free regions combined, then block 436 follows block 432. In block 436 any free pages from the non-pinned region are allocated first. Then, at block 438, any free pages in the free region are allocated. (If necessary, the end of non-pinned region pointer 140 is moved to reflect the newly allocated pages from the free region 120 (block 440).) Then, as indicated in block 442, any needed remaining pages are allocated from the pinned region 130. Following block 442 is block 490 at which the physical pages that have just been allocated are mapped to the virtual memory space that was allocated at block 410.

From the foregoing it will be understood that non-pinned memory allocation requests may be allocated using any unallocated space in the physical memory space, but with space allocated in the following order of preference: first the non-pinned region, second the free region, and the pinned region last. Allocations from the free region are made beginning from the end of non-pinned region pointer 140 toward the end of pinned region pointer 150, and the end of non-pinned region pointer 140 is shifted to reflect the allocation from the free region.

FIGS. 5A–5D together form a flow chart that illustrates processes in accordance with the invention for handling pinned memory allocation requests.

Figure 5A:
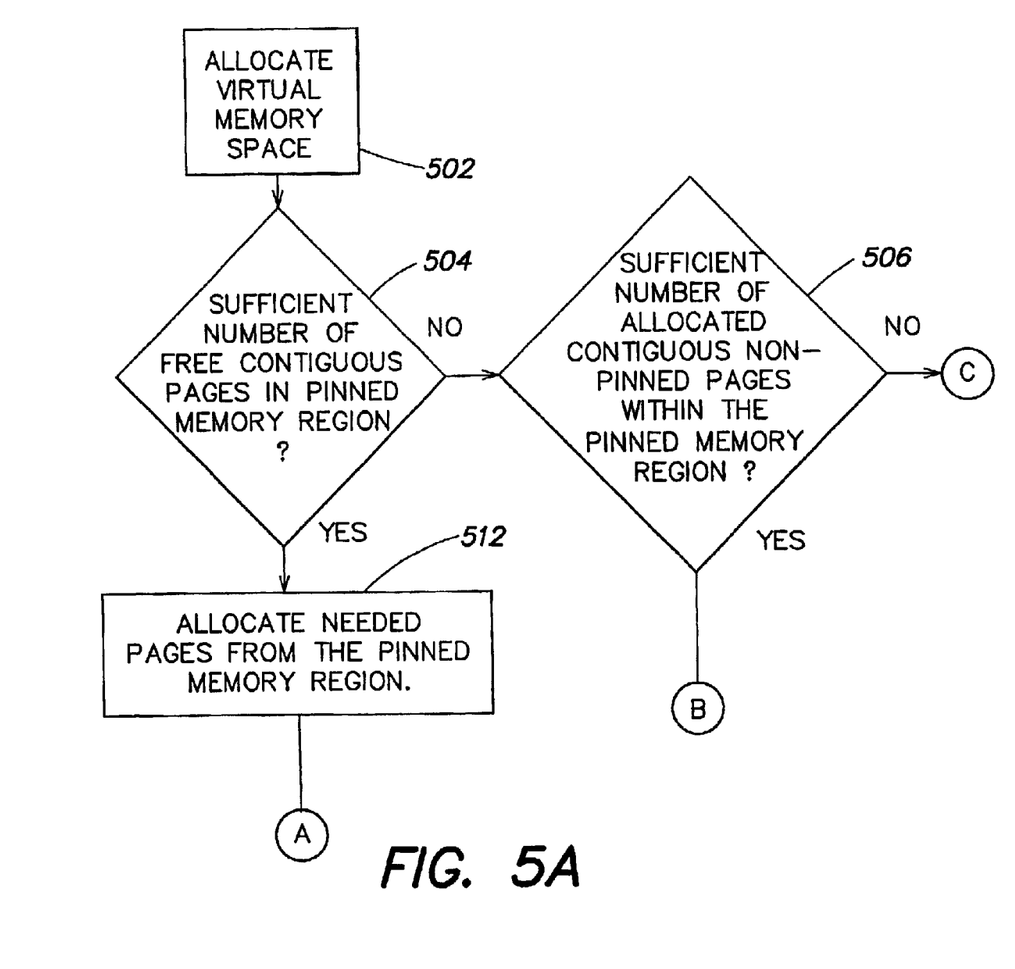
FIGS. 5A–5D together form a flow chart that illustrates a process for handling a pinned memory request in accordance with the invention.

Initially, when a request for a pinned memory block is received, a virtual memory range is allocated, as indicated at block 502. Then, at decision block 504, it is determined if there is a sufficient number of free contiguous pages in the pinned region 130. In other words, it is determined whether there is any unoccupied hole of adequate size in the pinned region. If so, then block 512 follows. At block 512, the set of contiguous pages which best fits the number of contiguous pages requested is allocated.

By "best fit" it will be understood that the smallest hole of adequate size is used. Following block 512 is block 514, at which the physical memory space which has just been allocated is mapped to the virtual memory space allocated at block 502.

Figure 5B:
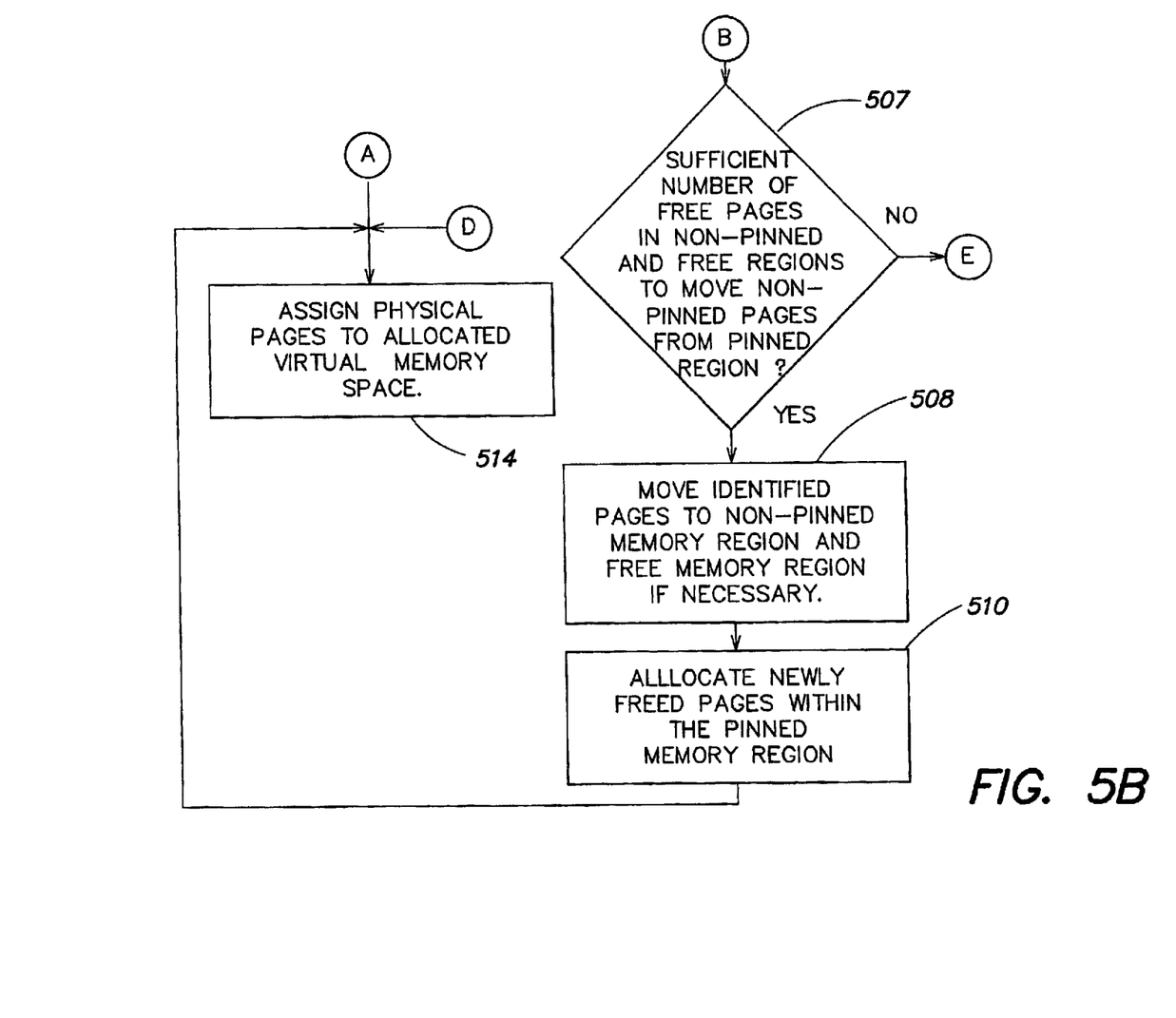

If a negative determination is made at block 504, then decision block 506 follows block 504. At block 506 it is determined whether there is a sufficient number of allocated contiguous non-pinned pages (including adjacent unallocated space) within the pinned region to satisfy the received request. I.e., it is determined whether an adequate "hole" occupied or partially occupied by a non-pinned block or blocks exists in the pinned region. If so, then decision block 507 follows block 506. At decision block 507 it is determined whether there is a sufficient number of free pages in the non-pinned and free regions to accommodate moving the non-pinned pages in the identified hole from the pinned region. If such is the case, then block 508 follows. At block 508 the non-pinned pages of the identified hole are moved from the pinned region to the non-pinned region and also to the free region if necessary. Then, at block 510, the newly freed pages within the pinned region are allocated to the memory request. Following block 510 is block 514, at which the allocated physical pages are mapped to the virtual memory space allocated at block 502.

If a negative determination was made at block 507, then the memory allocation fails (block 522, FIG. 5C) and a suitable message is sent.

The processing involved in decision blocks 504, 506 and 507 may be arranged such that, if the best fit for the received pinned memory allocation request is in a hole that is occupied or partially occupied by non-pinned pages, and if there are sufficient free pages to move the non-pinned pages to the non-pinned region and/or the free region (or elsewhere in the pinned region), then the best-fitting occupied hole is used instead of the best-fitting non-occupied hole.

Considering again decision block 506, if a negative determination is made at that block, then decision block 516 (FIG. 5C) follows. At decision block 516 it is determined if there is a sufficient number of pages within the free region 120 to satisfy the received pinned memory allocation request.

Figure 5C:
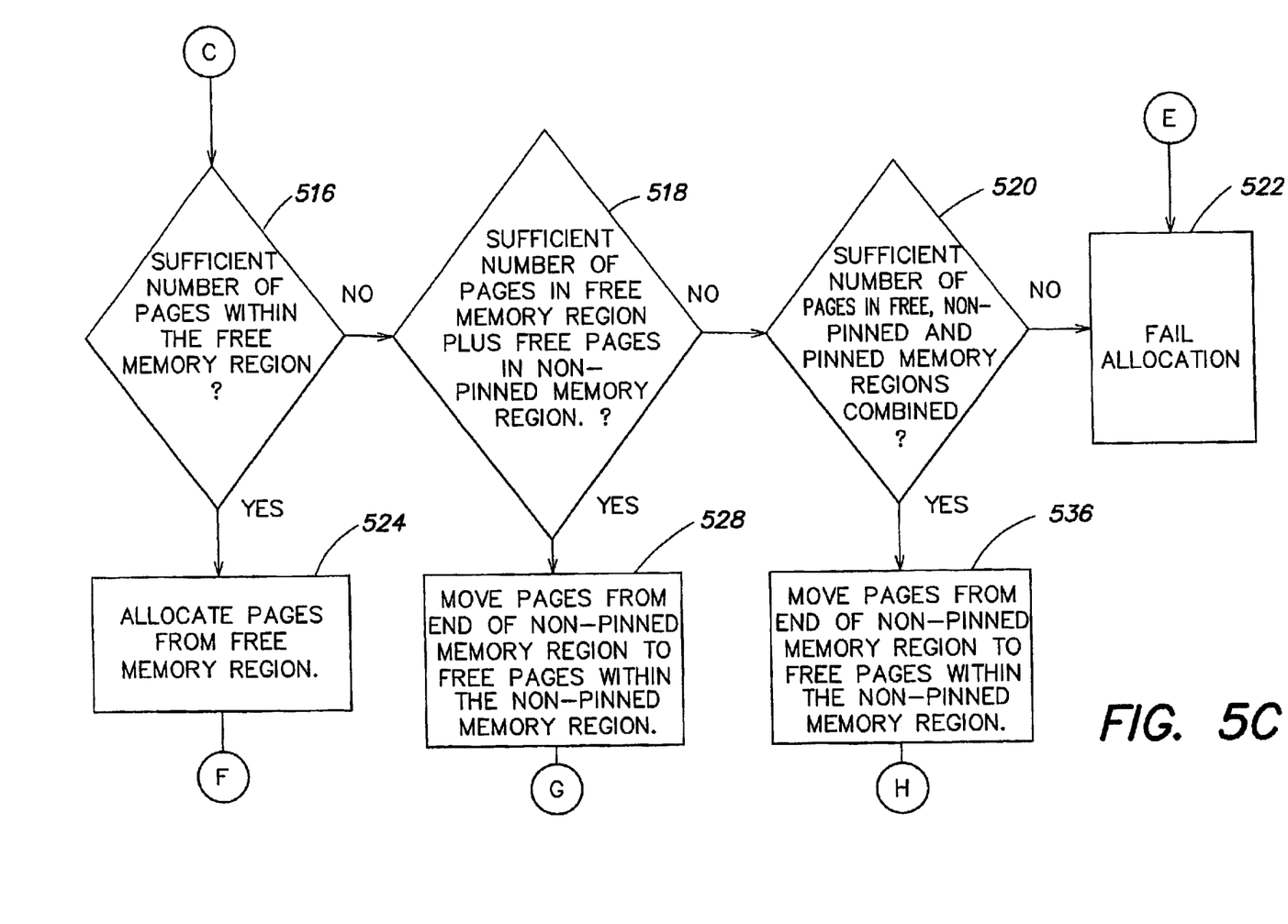

If so, block 524 follows. At block 524 the number of needed pages is allocated from the free memory region. The pages allocated from the free memory region are a set of contiguous pages starting with the page pointed to by the end of pinned region pointer 150. Next, as indicated at block 526, the end of pinned region pointer 150 is updated to include the pages allocated from the free memory region. Block 526 is followed by block 514, at which the allocated physical memory pages are mapped to the virtual memory space allocated at block 502.

Figure 5D:
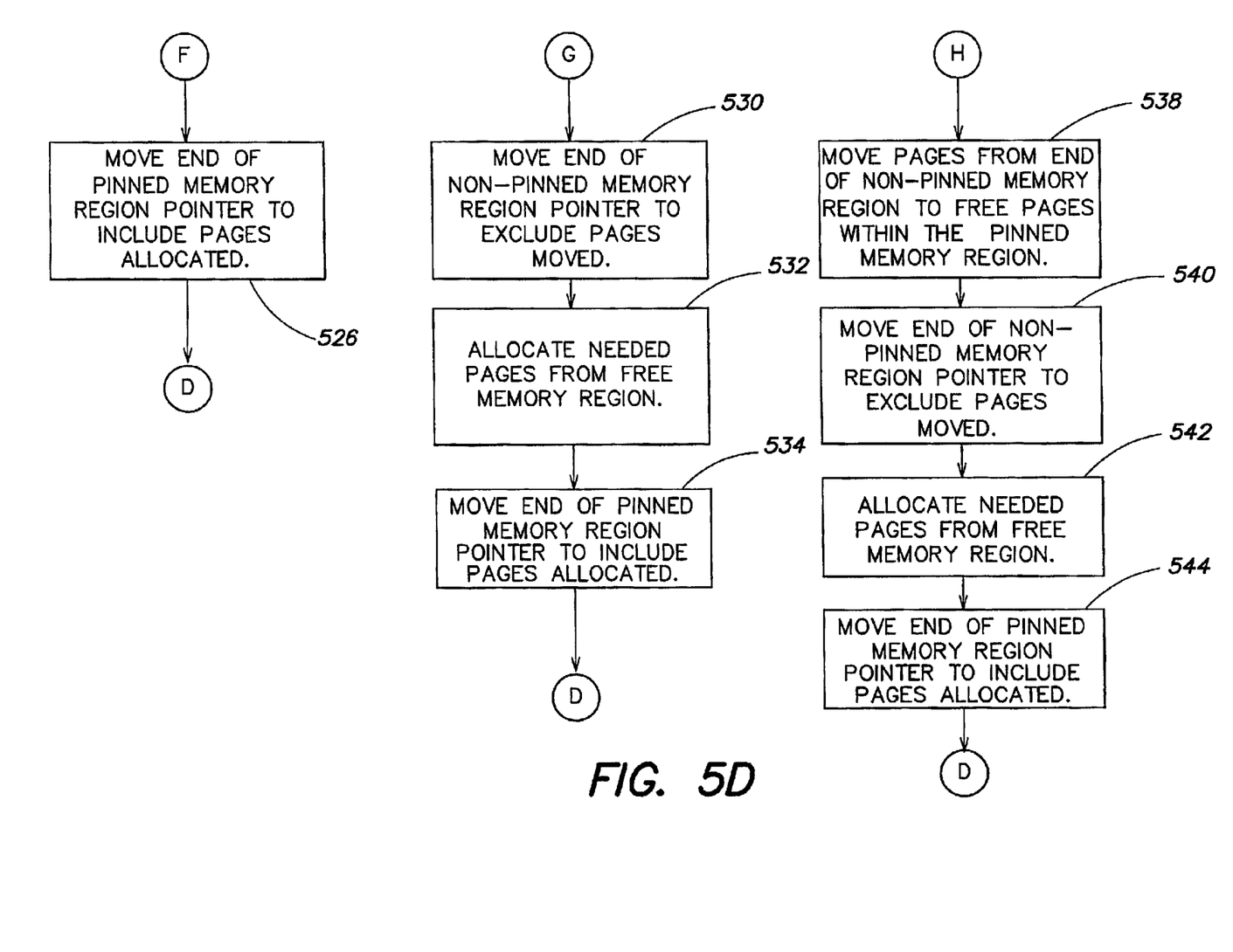

If a negative determination is made at block 516, then decision block 518 follows. At decision block 518 it is determined whether there is a sufficient number of pages in the free region plus free pages in the non-pinned region to satisfy the received pinned memory allocation request. If so, then block 528 follows 518. At block 528 pages from the end of the non-pinned region are moved to fill holes starting from the beginning of the non-pinned region 110, thereby widening free region 120. Then block 530 follows. At block 530 the end of non-pinned region pointer is updated to exclude the pages that were moved at block 528. Following block 530 is block 532. At block 532 the pages needed for the received pinned memory allocation request are allocated from the now-widened free memory region. Then, at block 534, the end of pinned region pointer 150 is updated to include the pages allocated at block 532.

Following block 534 is block 514, at which the allocated physical memory pages are mapped to the virtual memory space allocated at block 502.

Considering again block 518, if a negative determination is made at that block, then decision block 520 follows. At block 520 it is determined if there is a sufficient number of free pages in the free, non-pinned and pinned regions combined. If not, the memory allocation fails (block 522) and a suitable message is sent. But if a positive determination is made at block 520, then block 536 follows. At block 536 pages from the end of the non-pinned region 110 are moved to unoccupied pages within the non-pinned region. Further, at block 538, a sufficient number of pages are moved from the end of the non-pinned region to unoccupied pages within the pinned region to generate a number of free pages within the free region 120 that is adequate to satisfy the received pinned memory allocation request. It will be appreciated that the movement of non-pinned pages at blocks 536 and 538 serves to widen the free region 120. Following block 538 is block 540. At block 540 the end of non-pinned region pointer 140 is updated to exclude the pages moved at steps 536 and 538. Then, at block 542, the pages needed to satisfy the received pinned memory allocation request are allocated from the now widened free region 120. Following 542 is block 544. At block 544 the end of pinned region pointer 150 is updated to include the pages allocated at block 542.

Block 514 follows block 544. At block 514 the allocated physical pages are mapped to the virtual memory space that was allocated at block 502.

From the foregoing discussion of FIGS. 5A–5D, it will be understood that pinned memory requests are allocated only from a suitable hole in the pinned region or from the free region at a point adjacent the pinned region. A hole in the pinned region may be cleared of non-pinned pages, or the free region may be widened, to accommodate the pinned memory request. Widening the free region is performed by moving non-pinned pages from the end of the non-pinned region to holes in the non-pinned region and in the pinned region, with holes in the non-pinned region preferably being filled first.

Figure 6:
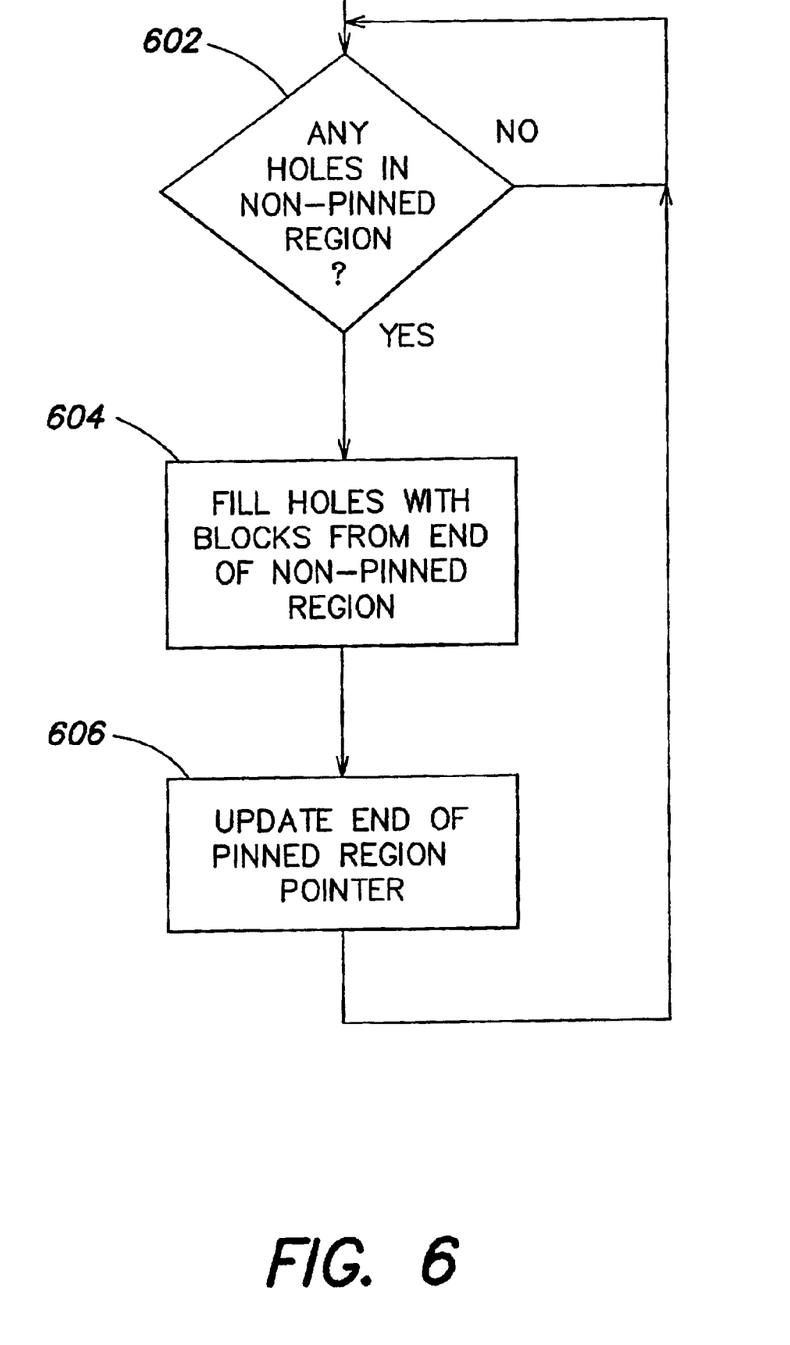
FIG. 6 is a flow chart that illustrates a process carried out in background to compact the non-pinned memory region.

In addition to the memory allocation request handling procedures of FIGS. 4A–4B and 5A–5D, the present invention may also call for a process to be carried out in background to compact the non-pinned region 110. This compacting procedure may be performed in accordance with conventional practices and will be briefly described with reference to FIG. 6. FIG. 6 is a flow chart showing the compacting procedure. Initially, at decision block 602 in FIG. 6, it is determined whether there are any holes in the non-pinned region. If so, block 604 follows. At block 604 one or more memory blocks are moved from the end of the non-pinned region to fill holes in the non-pinned region. The holes are filled starting from the front of the non-pinned region. Then, at block 606, the end of non-pinned region pointer 140 is updated to reflect the movement of the memory blocks from the end of the non-pinned region.

To summarize, the present invention calls for a pinned memory region at one end of the physical memory space, a non-pinned region at the opposite end of the physical memory space and a free region defined between the pinned and non-pinned regions. By suitable procedures to maintain these regions, and particularly to maintain the free region as large as possible, fragmentation due to pinned memory blocks in minimized, and all available memory resources are used efficiently. Due to the presence of the free memory range, opportunities for accommodating large pinned memory allocation requests are maximized.

The foregoing description discloses only the preferred embodiments of the invention; modifications of the above disclosed apparatus and methods which fall within the scope of the invention will be readily apparent to those of ordinary skill in the art. For example, in the pinned memory allocation request handling procedure of FIGS. 5A–5D, priority is given to clearing and then filling holes in the pinned region that are occupied by non-pinned pages, rather than placing pinned memory allocations in the free region at the end of the pinned region. In other words, a preferred embodiment of the invention places block 506 ahead of block 516. However, the order of these two blocks can be reversed, so that if there is space available in the free region the pinned memory allocation request is accommodated therein, rather than clearing occupied holes in the pinned region. The preferred procedure, in which occupied holes are cleared in preference to using the free region, provides for greater compaction of the pinned region, but at the cost of lower processing performance.

While the present invention has been disclosed in connection with preferred embodiments thereof, it should be understood that other embodiments may fall within the spirit and scope of the invention, as defined by the following claims.

The invention claimed is:

1. A method of allocating memory requests in a physical memory space defined between a first boundary and a second boundary, the method comprising the steps of:

allocating non-pinned memory requests from the first boundary; and allocating pinned memory requests from the second boundary.

2. The method of claim 1, wherein a non-pinned region is provided from the first boundary toward the second boundary, a pinned region is provided from the second boundary toward the first boundary and a free region is defined between the non-pinned region and the pinned region, and further comprising:

receiving a pinned memory request;

determining whether a hole that accommodates the received pinned memory request exists in the pinned region;

if such a hole exists, allocating the received pinned memory request to the hole; and if such a hole does not exist, allocating the received pinned memory request in the free region adjacent the pinned region.

3. The method of claim 2, wherein if more than one such hole exists, the received pinned memory request is allocated to a smallest one of such holes.

4. The method of claim 2, further comprising operating a background process to compact the non-pinned region by moving at least one non-pinned memory block from an end of the non-pinned region adjacent the free region to fill at least one hole in the non-pinned region.

5. A method of allocating a memory request in a physical memory space defined between a first boundary and a second boundary, a non-pinned region being provided from the first boundary toward the second boundary and a pinned region being provided from the second boundary toward the first boundary and a free region being defined between the non-pinned region and the pinned region, the method comprising the steps of:

receiving a pinned memory request;

determining that there is no hole in the pinned region that accommodates the received pinned memory request;

determining that the free region is not large enough to accommodate the pinned memory request;

widening the free region by moving a non-pinned memory block from an end of the non-pinned region adjacent the free region to a hole in the pinned region; and allocating the received pinned memory request to the widened free region.

6. A method of allocating a memory request in a physical memory space defined between a first boundary and a second boundary, a non-pinned region being provided from the first boundary toward the second boundary and a pinned region being provided from the second boundary toward the first boundary and a free region being defined between the non-pinned region and the pinned region, the method comprising the steps of:

receiving a pinned memory request;

determining that there is a non-pinned memory block located in the pinned region that occupies a hole at least as large as the received pinned memory request;

moving said non-pinned memory block located in the pinned region to free said hole that is at least as large as the received pinned memory request; and allocating the received pinned memory request to said freed hole that is at least as large as the received pinned memory request.

7. The method of claim 6, wherein the non-pinned memory block is moved to the free region adjacent the non-pinned region.

8. A digital memory apparatus, comprising:
a memory component providing a physical memory space, the physical memory space defined between a first boundary and a second boundary; and
control means for controlling allocation of the physical memory space, the control means being programmed to:
allocate non-pinned memory requests from the first boundary; and
allocate pinned memory requests from the second boundary.

9. The apparatus of claim 8, wherein a non-pinned region is provided from the first boundary toward the second boundary, a pinned region is provided from the second boundary toward the first boundary and a free region is defined between the non-pinned region and the pinned region, and the control means is further programmed to:
receive a pinned memory request;
determine whether a hole that accommodates the received pinned memory request exists in the pinned region;
if such a hole exists, allocate the received pinned memory request to the hole; and
if such a hole does not exist, allocate the received pinned memory request in the free region adjacent the pinned region.

10. The apparatus of claim 9, wherein if more than one such hole exists, the control means is programmed to allocate the received pinned memory request to a smallest one of such holes.

11. The apparatus of claim 9, wherein the control means is further programmed to operate a background process to compact the non-pinned region by moving at least one non-pinned memory block from an end of the non-pinned region adjacent the free region to fill at least one hole in the non-pinned region.

12. A digital memory apparatus, comprising:
a memory component providing a physical memory space, the physical memory space defined between a first boundary and a second boundary, a non-pinned region being provided from the first boundary toward the second boundary and a pinned region being provided from the second boundary toward the first boundary and a free region being defined between the non-pinned region and the pinned region; and
control means for controlling allocation of the physical memory space, the control means being programmed to:
receive a pinned memory request;
determine that there is no hole in the pinned region that accommodates the received pinned memory request;
determine that the free region is not large enough to accommodate the pinned memory request;
widen the free region by moving a non-pinned memory block from an end of the non-pinned region adjacent the free region to a hole in the pinned region; and
allocate the received pinned memory request to the widened free region.

13. A digital memory apparatus, comprising:
a memory component providing a physical memory space, the physical memory space defined between a first boundary and a second boundary, a non-pinned region being provided from the first boundary toward the second boundary and a pinned region being provided from the second boundary toward the first boundary and a free region being defined between the non-pinned region and the pinned region; and
control means for controlling allocation of the physical memory space, the control means being programmed to:
receive a pinned memory request;
determine that there is a non-pinned memory block located in the pinned region that occupies a hole at least as large as the received pinned memory request;
move said non-pinned memory block located in the pinned region to free said hole that is at least as large as the received pinned memory request; and
allocate the received pinned memory request to said freed hole that is at least as large as the received pinned memory request.

14. The apparatus of claim 13, wherein the control means is programmed to move the non-pinned memory block to the free region adjacent the non-pinned region.

15. A computer program product comprising:
a medium storing the program product and readable by a computer, the computer readable medium having computer program code adapted to:
allocate non-pinned memory requests from a first boundary of a physical memory space defined between the first boundary and a second boundary; and
allocate pinned memory requests from the second boundary of the physical memory space.

16. A method of handling memory allocation requests in a physical memory space, a non-pinned region being defined at a first end of the physical memory space and a pinned region being defined at a second end of the physical space, the second end being opposite to the first end, a free region being defined between the non-pinned region and the pinned region, the method comprising:
(i) responding to a non-pinned memory allocation request by allocating free space from the non-pinned region first, from the free region second and from the pinned region last; and
(ii) responding to a pinned memory request only by one of: (a) allocating space from a hole in the pinned region or (b) allocating free space from the free region.

17. The method of claim 16, wherein step (i) includes allocating free space from the free region beginning from the non-pinned region toward the pinned region, and step (ii) includes allocating free space from the free region beginning from the pinned region toward the non-pinned region.

18. The method of claim 16, wherein step (ii) includes moving at least one non-pinned page from the hole in the pinned region.

19. The method of claim 16, wherein step (ii) includes widening the free region.

20. The method of claim 19, where the widening of the free region includes moving at least one non-pinned page from an end of the non-pinned region.

* * * * *